United States Patent [19]
Roberts

[11] Patent Number: 5,541,654
[45] Date of Patent: Jul. 30, 1996

[54] FOCAL PLANE ARRAY IMAGING DEVICE WITH RANDOM ACCESS ARCHITECTURE

[75] Inventor: Peter C. T. Roberts, Gilbert, Ariz.

[73] Assignee: Litton Systems, Inc., Woodland Hills, Calif.

[21] Appl. No.: 486,005

[22] Filed: Jun. 8, 1995

Related U.S. Application Data

[62] Division of Ser. No. 79,094, Jun. 17, 1993, Pat. No. 5,452,004.

[51] Int. Cl.$^6$ ............................................. H04N 5/335
[52] U.S. Cl. ................................. 348/301; 348/302
[58] Field of Search ................................ 348/207, 218, 348/307, 308, 309, 300, 301, 302, 294; 250/208.1; H04N 5/335

[56] References Cited

U.S. PATENT DOCUMENTS

| | | | |
|---|---|---|---|
| 4,471,228 | 9/1984 | Nishizawa et al. | 250/578 |
| 4,597,012 | 6/1986 | Itoh et al. | 348/308 |
| 4,937,674 | 6/1990 | Mizoguchi et al. | 348/307 |
| 4,945,418 | 7/1990 | Mutoh | 348/308 |
| 5,262,871 | 11/1993 | Wilder et al. | 348/307 |

*Primary Examiner*—Wendy R. Garber
*Assistant Examiner*—Tuan V. Ho
*Attorney, Agent, or Firm*—Poms, Smith, Lande & Rose

[57] ABSTRACT

An imaging device includes an array of plural imaging elements each of which is responsive to incident light flux to provide an output signal. Each of the imaging elements includes provision for conducting a variable time integration of incident light flux, and alternatively, also for selecting a time interval during which each of the imaging elements simultaneously conducts such a time integration of incident light flux (i.e., takes a snap shot of an image scene). The imaging device includes provision for random access of each image element or group of image elements in the array so that output signals indicative of all or of only selected parts of an imaged scene can be processed for their image information, if desired. The other parts of an imaged scene may not be considered or may be considered for their image information at a lower sampling rate than the selected parts of the scene so that image information about the selected parts of the image scene can be accessed at a much higher rate than is conventionally possible. A variable gain feature allows selective canceling of fixed-pattern noise, interference, or unwanted image information. An anti-blooming feature prevents charge from an excessively bright image source from cascading across the array. Also, a control cache memory allows control commands to be fed to the device at a high rate and to be implemented at a slower rate on a first-in, first-out basis.

27 Claims, 6 Drawing Sheets

FOCAL PLANE ARRAY IMAGING DEVICE WITH RANDOM ACCESS ARCHITECTURE

This is a divisional of application Ser. No. 08/079,094 filed on Jun. 17, 1993 now U.S. Pat. No. 5,452,004.

BACKGROUND OF THE INVENTION

1. Field of the Invention

The present invention relates to a focal plane array imaging device. More particularly, the present invention relates to an imaging device of the focal plane array type which may be employed for visible light, for infrared radiation, or for electromagnetic radiation of other frequencies. The device includes an architecture which allows individual image elements, or pixels, of the device to be randomly accessed individually or in groups. Consequently, the pixels of the device may be scanned individually row by row like a conventional focal plane array imaging device, or the pixels may be accessed individually or in groups to define one or more windows on the array in which an image or images of interest are located. Additionally, the present device allows time-integration at the pixels themselves of a signal originating with electromagnetic radiation from a source which is to be imaged. Thus, low-level image sources which might otherwise be difficult to distinguish from background noise or which would require specialized signal processing may be imaged conveniently with the present imaging device. Also, the time integration feature allows the sensitivity of the array to be dynamically varied and to be different in different windows on the array to accommodate the photovoltaic charge-producing sensitivity of a photoreceptor of the pixels with the particular level of radiation received from particular sources imaged within the different windows on the array.

2. Discussion of Related Technology

Conventional focal plane array imaging devices both for visible light, and for other portions of the electromagnetic spectrum, have been known for some time. These devices are generally of the charge-coupled type or of the direct-injection type. For purposes of convenience and simplicity in description hereinafter, the term "light" or "light-responsive", and other such terms, should be understood to refer to the electromagnetic spectrum in general, and may include both infrared, and ultra-violet radiations, and other frequencies in addition to visible light.

These known conventional focal plane array imaging devices currently are fabricated as arrays of light-responsive elements, or pixels, as thin-film devices generally in a rectangular array of photo-responsive receptors on the face of a semiconductor substrate. The devices are fabricated using conventional thin- film, and other currently-known semiconductor fabrication techniques.

Importantly, all known conventional imaging devices of the focal plane array type are based on an architecture which requires the pixels of the device to be accessed in serial order. That is, the image signal from the pixels is fed out of the imaging device as an analogue or digital data stream representing light levels incident on the pixels individually in a row by row scan of the array. Generally this scan starts at one corner of the rectangular array and proceeds across the row of pixels individually, preceding subsequently across the next or adjacent row of pixels. Of course, scanning every other row of the array with the scan rate being such that two such partial scans of alternate rows are completed in the same time as would be required for a complete scan of adjacent rows is also known to reduce the flicker of a video image (interlacing). With either type of scanning, this type of serial image output signal indicative of a pixel scan is long-familiar from the television technology.

Unfortunately, when it is desired to concentrate attention on a stationary or moving image which resides in a particular part of the image array and occupies a comparatively small portion of the array, a large part of the serial information in the signal stream is of little or no interest. That is, after the last portion of the serial signal stream which includes information about an image of interest is received, almost the entire remaining portion of the array scan (or scan of interlacing alternate rows) must be completed before the scan will return to the area of the array which is of particular interest. Thus, time is lost in acquiring image information from the part of the array which is of most interest. This time loss is the case even is signal acquisition circuitry is employed to acquire and concentrate attention on (i.e., create a window of image out of) the array signal stream.

When it is desired to acquire an image of an image source which is fast-moving or of a low-level source, or both, then the time lost in scanning the entire array, including those areas of the array where image information of little or no interests is located, is a great detriment. This time loss can result, for example, in loss of the image source from the field of view of the imaging system, in confusion of background noise sources for the image source of interest, or both.

One conventional expedient is to simply increase the scanning rate at which the pixels of an imaging device are accessed. This increase of scanning rate results in the scan returning to the area of the array which is of interest more quickly and with less loss of time between scans of the interesting area. However, when the image to be generated is digitized, the analogue-to-digital converters (digitizers) themselves have a finite settling time which limits the rate at which the array can be scanned. The conventional solution to this lack of speed in array scanning is to use plural digitizers in parallel. In this architecture, each of the plural digitizers in sequence is supplied with a portion of the analogue data stream, and is then interrogated for its portion of the resulting digital signal after the digitizer has had time to settle. With the digitizers sharing the load, doubling the scanning speed requires double the number of digitizers. Of course, it is easily seen that this conventional expedient itself has limitations with respect to the cost and complexity of the overall imaging system. As the rate of pixel scanning increases, the number of digitizers required becomes prohibitive.

On the other hand, when it is desirable to image a low-level image source, another limitation of conventional image devices with serial scanning becomes apparent. That is, the sensitivity of the image pixels to the incident radiation from the source cannot be conveniently increased beyond the inherent photovoltaic charge-producing sensitivity of the photodetectors themselves. This sensitivity of the photodetectors is limited because each pixel must not saturate under ordinary operating conditions in the time between scans. With this limitation on the sensitivity of the photodetectors of conventional imaging devices, it is apparent that when a low-level source is to be imaged, the array is low in sensitivity. Thus, the image of a low-level image source may be very difficult to distinguish from the background noise which is also incident on the array.

This problem of a comparatively inflexible image intensity range or sensitivity also manifests itself in image blooming when the conventional arrays are employed to image a high-level source. The image pixels saturate and flood signal onto adjacent pixels so that the output image grows and the true image is lost. That is, the imaging device is unable to differentiate the image of the source from the blooming of signal cascading across the array from saturated pixels. In this case also, the image of interest may be lost from the imaging system because of shortcomings in the imaging array itself.

SUMMARY OF THE INVENTION

In view of the above, the present invention has as a primary object the provision of an imaging array which allows random access to the individual pixels, or groups of pixels, in the array;

It is an additional object for the present invention to provide such an imaging device which provides for windowing on the array.

Another object for the present invention is to provide an imaging array which allows a time-integration function to be performed at the pixels of the array itself for imaging both high-level and low-level image sources;

Yet another object of the present invention is to provide such an imaging device which allows varying time-integration of image light on each window of the array.

Still another object for the present invention is to provide such an imaging device with a convenient way of preventing saturation of the pixels and image blooming under all imaging conditions.

In view of the above, the present invention provides an imaging device including a semiconductor substrate, plural light-responsive image elements defined in an array on the substrate, and means for randomly accessing the image elements individually or in groups of less than the full plurality of elements on the array.

Additionally, the present invention provides such an imaging device further including means for allowing a variable time integration of light flux incident on each pixel of the imaging array.

Still further, the present invention provides such an array with structure preventing blooming of the image on the array in the event that a high level image is incident on the array.

Yet further, the present invention includes means for allowing a "snap shot" of the image incident on the array to be taken which holds at each pixel of the array a value indicative of the light flux on the pixels during a time integration period of the "snap shot".

The above and additional objects and advantages of the present imaging device will appear from a reading of the following description of a particularly preferred exemplary embodiment of the invention taken in conjunction with the following drawing Figures.

DESCRIPTION OF A PREFERRED EMBODIMENT OF THE INVENTION

Figure 1:
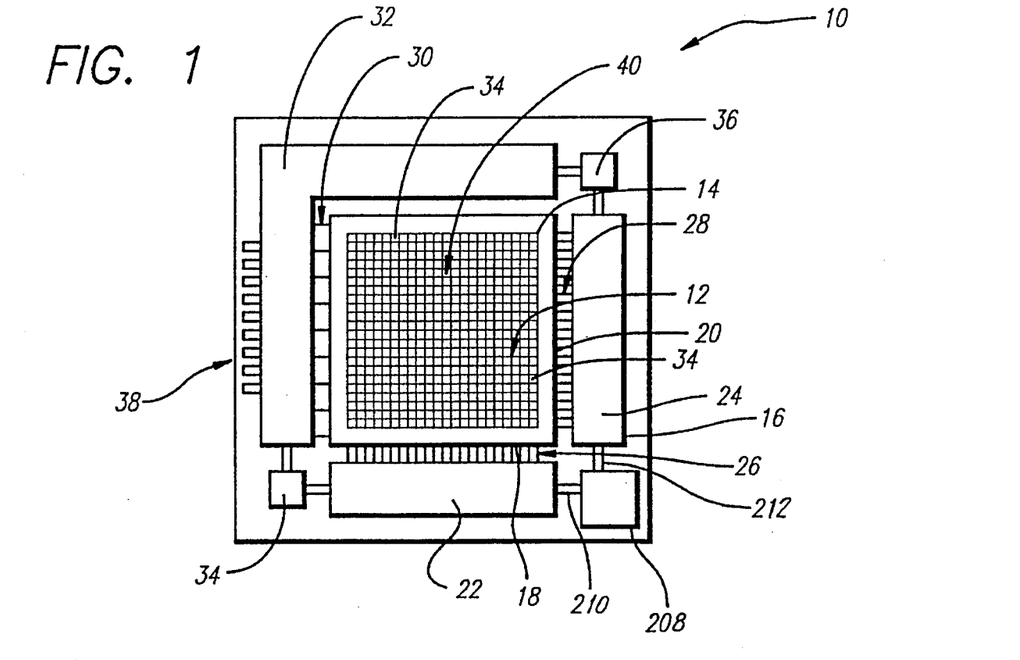
FIG. 1 provides a plan view of an imaging device embodying the present invention.

Viewing FIG. 1, an imaging device 10 includes an array 12 formed on a substrate 14. The substrate 14 is mounted on a base, generally referenced with the numeral 16, along with other circuitry and interconnection traces and connectors, to be described. Also carried upon the base 16 adjacent respective side edges 18 and 20 of the substrate 14, are respective decoding and latching circuits, referenced with the numerals 22 and 24. A multitude of fine-dimension conductive traces, which are generally referenced with the numerals 26 and 28, respectively connect the array 12 with the circuits 22 and 24. Also connected with the array 12 by a plurality of traces, referenced with the numeral 30, is a control circuit, which is referenced with the numeral 32. This control circuit 32 performs power supply, signal acquisition and processing functions, as well as other functions which will be further explained hereinbelow. Interconnect structures, generally referenced with the numerals 34 and 36, connect the decoding and latching circuits 22 and 24 with the control circuit 32. This control circuit 32 also has connection with connector pads 38 located at a side edge of the base 16 for receiving power and command signals, as well as for providing image output signals, as will be further described.

Figure 2:
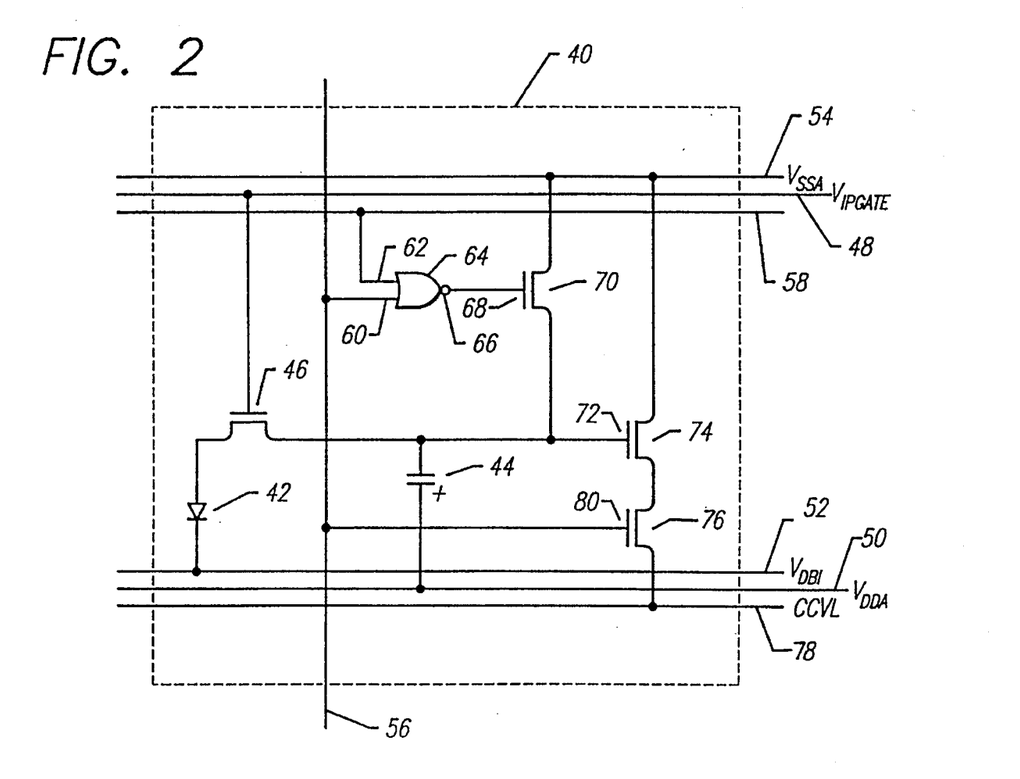
FIG. 2 is a schematic representation of a pixel of the imaging device seen in FIG. 1.

Viewing now FIGS. 1 and 2 in conjunction, it is seen that the array 12 includes a large number of substantially identical image elements, or pixels, generally referenced with the numeral 40. By way of example only, and not as a limitation on the invention, the array 12 may include a rectangular array of 200×200 pixels (40,000 pixels) each of twenty microns square shape, and located in adjacent rows and columns on a thirty micron pitch. Alternatively, the array 12 may include, for example, a rectangular array of 128×128 pixels (16,384 pixels) each of thirty microns square shape and located in adjacent rows and columns on a pitch of substantially 40 microns. Other numbers of pixels and array shapes are equally possible, as will be apparent to those ordinarily skilled in the pertinent arts. For example, it may be desirable to have the array 12 of hexagonal shape and to include a multitude of pixels themselves of triangular or hexagonal shape, for example. The geometric arrangement of the array 12, and of the pixels defined on the array, is not critical to the present invention. Consequently, the rectangular (square) shape of the array 12 of the depicted and described exemplary embodiment of the invention is a convenience only, and is not a limitation on the invention.

FIG. 2 provides a schematic representation of an exemplary individual pixel 40 of the array 12. This pixel 40 includes a photodiode 42 connected to a charge integrating storage capacitor 44 by an n-channel field-effect transistor (FET) 46. The gate bias on transistor 46 is controlled by a conductive trace 48 extending across the array 12 with branch connection to the gate of the FET 46. The trace 48 connects to all of the pixels 40 in a row across the array 12, and similar connected traces connect to each of the rows of the pixels 40 up and down the array 12 so that the analogue bias voltage on the transistors 40 of each pixel in the array 12 is common or the same throughout the array. For purposes of identification, the signal on trace 48 is identified as "Vipgate". Because the FET 46 is an N-channel device, it is not conductive with a zero bias voltage applied thereto, and becomes more conductive with increasing bias voltage.

Similarly, the cathode of the photodiode 42 is connected to a conductive trace 52 with branch connections which is identified with the signal "Vdbi". The signal "Vdbi" is the common cathode bias voltage of all of the photodiodes 42 in the array 12, and similar traces connect all the pixels in each row throughout the array 12. Still similarly, the positive plate of the capacitor 44 is branch connected to a trace 50 having an analogue signal value of "Vdda" thereon. This signal "Vdda", like a reference signal "Vssa" carried on a conductive trace 54, is an analogue voltage level common to all of the pixels on the array 12.

In order to access the individual pixel 40 seen in FIG. 2, a pair of exemplary address traces 56 and 58 respectively extend vertically and horizontally across the array 12. Each pixel in the column of pixels above and below the pixel 40 seen in FIG. 2 is connected with the trace 56. And each pixel in each column of pixels on the array 12 is connected to a respective similar address trace for that column. The connectors to the respective address traces for the multitude of columns of pixels on array 12 are seen in FIG. 1 referenced with the numeral 26. In like fashion, the traces 58 connect to each pixel in each row of pixels on the array 12. That is, each row of pixels on the array 12 has a respective address trace. These traces are connected by the connectors seen on FIG. 1 referenced with the numeral 28.

Traces 56 and 58 are connected to respective input contacts 60 and 62 of an "nor" gate 64 the inverting output 66 of which connects to the gate 68 of a FET 70. This FET 70 functions as a switch and connects the negative plate of the capacitor 44 with the trace 54 carrying signal "Vssa". The negative plate of capacitor 44 is also connected to the gate 72 of a FET 74 which is in series with another FET 76 connecting the signal line 54 with signal "Vssa" thereon to a trace 78 designated to carry the signal identified as "CCVL". This latter signal acronym stands for "common column video line", and will be seen to be the image output signal from respective individually addressed pixels in the array 12. The gate 80 of transistor 76 is connected to trace 56 so this transistor functions as a switch and is off or open when trace 56 carries a logic low or zero voltage signal, and turns on or closes when the logic signal on trace 50 goes logic high.

Figures 3, 4:
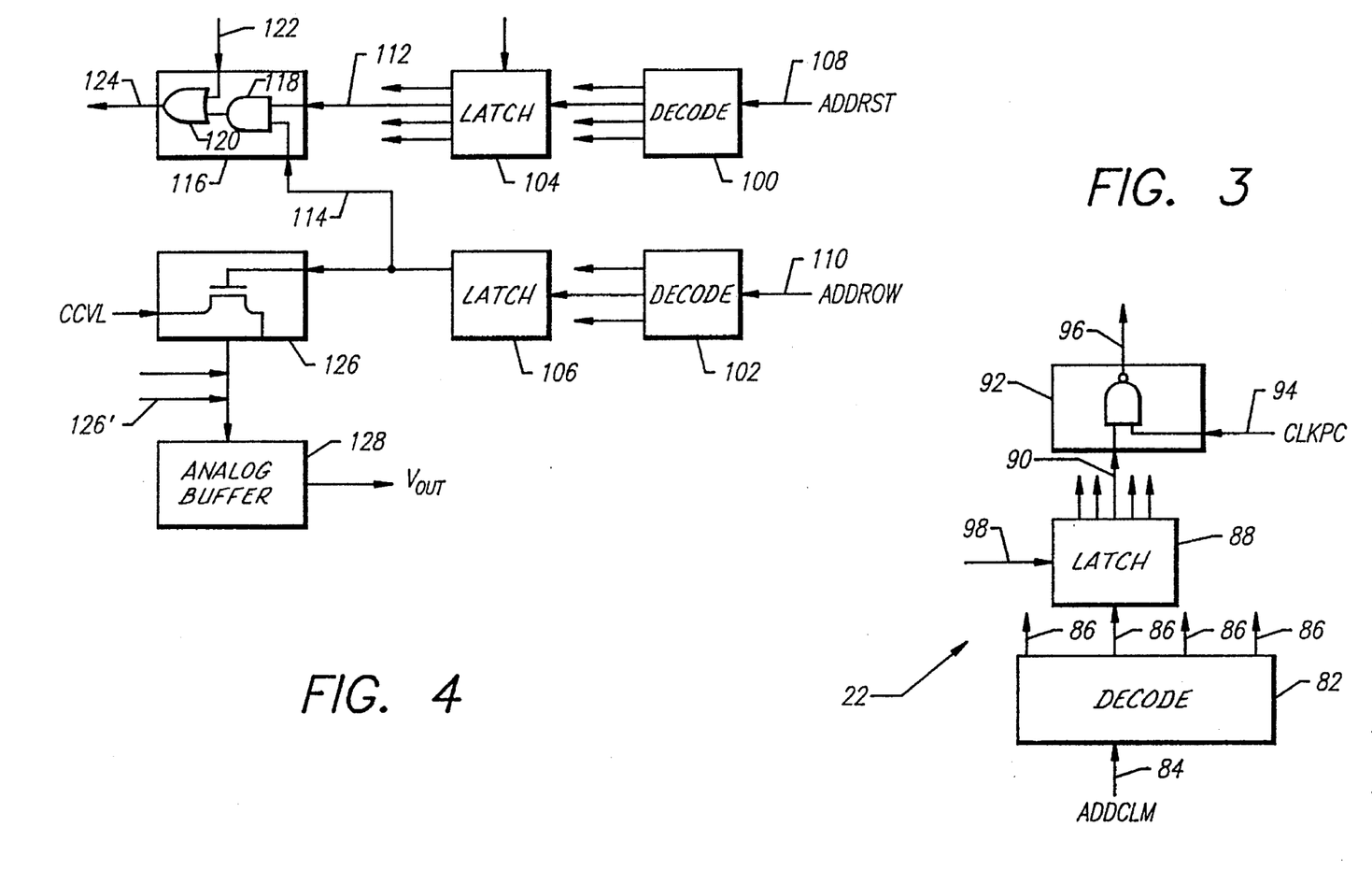
FIGS. 3 and 4 are schematic block-diagram representations of image signal acquisition and processing circuitry of the imaging device seen in FIG. 1.

Further considering now FIGS. 1 and 3, the decoder and latch circuit 22 is seen to include a column select decoder, referenced with the numeral 82, which receives a digital column address, as is indicated by arrow 84, identified with the acronym, "ADDCLM". This decoder 82 includes a number of outputs 86 which individually correspond to the columns of pixels in array 12, and one of which receives a column select signal responsive to the address 84. Each of the outputs 86 of decoder 82 connects with a respective column address latch. An exemplary column select latch 88 is depicted in FIG. 3, and receives the particular column select output 86 from the decoder 82. This latch 88 outputs a column select hold signal, as is indicated by arrow 90. A clocked buffer 92 receives the column select hold signal 90 from latch 88, along with a clocked precharge signal, "CLKPC", which is indicated by arrow 94. As is indicated schematically within the buffer 92, this output buffer performs the function of an "nand" gate so that a column access signal, indicated by arrow 96 is output to the respective trace 56 when both the column select hold signal 90, and clocked precharge signal 94 are logic low.

Each of the outputs 86 of the decoder 82 is similarly provided with a respective column select latch, column select output buffer, and connection (via one of the connectors 26) to a respective column of pixels on the array 12. When the clock precharge signal 94 goes logic low, the column access signal also goes logic low, and a reset command is provided by control circuit 32 to the column select latch 88 (as is indicated by arrow 98) in preparation for a new column select output 86 from decoder 82 responsive to a next successive column address 84.

Figure 5:
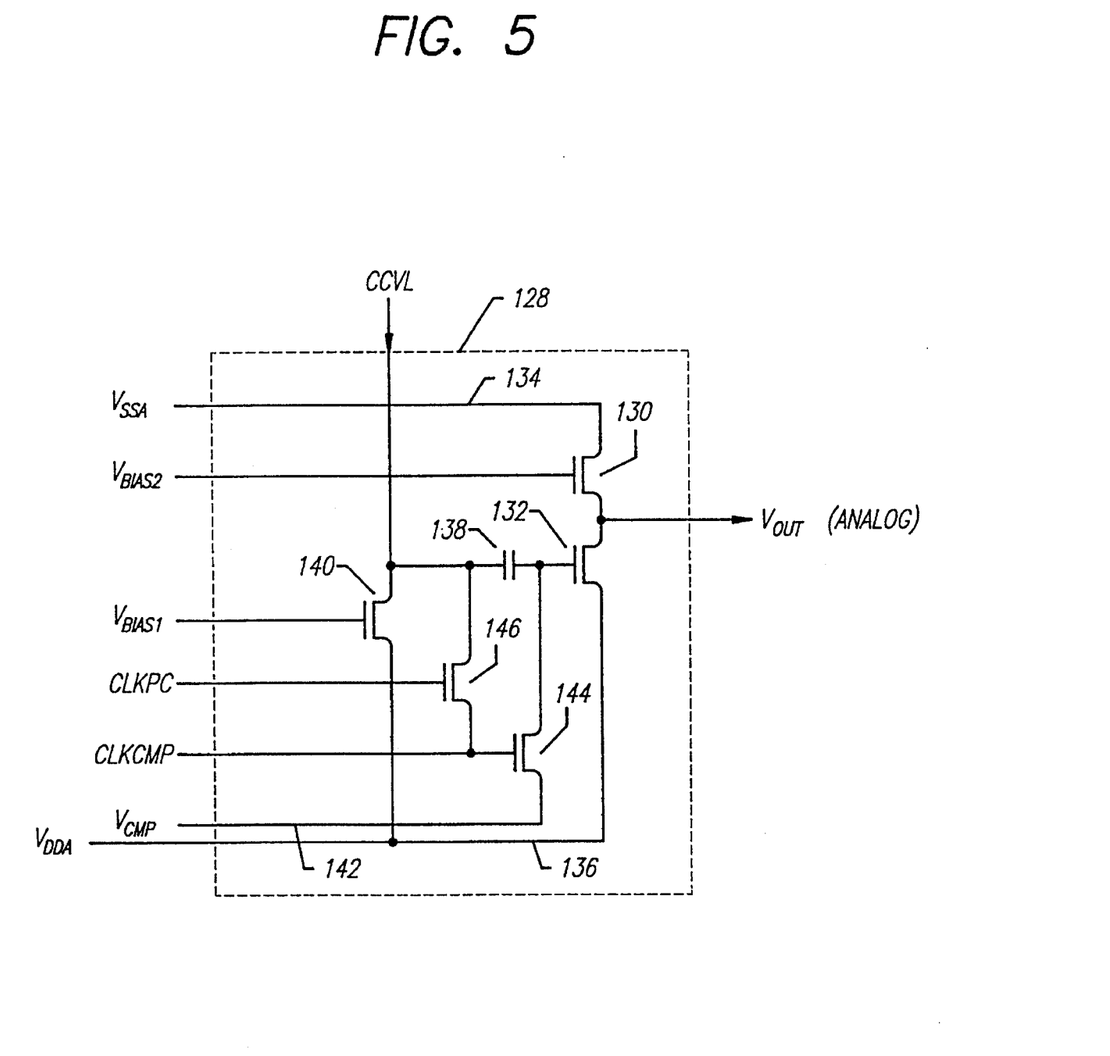
FIG. 5 is a schematic representation of image signal processing circuitry seen also as part of the block diagram of FIG. 4.

FIGS. 4 and 5 in conjunction show that the decoder and latch circuit 24 includes a pair of parallel decoders, referenced with numerals 100 and 102, each with an associated latch, respectively referenced with the numerals 104 and 106. The decoder 100 receives a digital row reset address, indicated with arrow 108, and referred to with the acronym, "ADDRST". Similarly, decoder 102 receives a digital row select address, indicated by arrow 110, and referred to with the acronym, "ADDROW". Each of these decoders 100, 102 has a number of outputs corresponding to the number of rows of pixels in array 12, and each associated with a respective latch for holding the output corresponding to a row address (either for row reset or row selection, respectively). The latches 104, 106 similarly have a number of outputs corresponding to the number of rows of pixels in array 12, and each outputting a respective row reset signal, or row select signal, respectively indicated by arrows 112 and 114.

These row reset (112) and row select (114) outputs from the latches 104 and 106 are connected to a respective multitude of row reset/select output buffers corresponding in number also to the number of rows of pixels in array 12. An exemplary one of the row reset/select buffers 116 is depicted in FIG. 4, and as is schematically indicated, functions as an "AND" gate 118 in series with an "OR" gate 120. The "AND" gate 118 at one input terminal receives the row reset signal 112, and at its other terminal receives the row select signal 114. The output of "AND" gate 118 is connected to the "OR" gate 120, which also receives a signal indicated with arrow 122, and identified with the acronym, "RST-DID". This output buffer 116 has connection for an output signal, as is indicated by the arrow 124, to the trace 58 for a respective one of the rows of pixels 40 on array 12. Recalling FIG. 1, the plurality of individual connections from the decode and latch circuit 24 to the rows of pixels on array 12 are collectively indicated with the numeral 28.

Because of the connection of each reset/select buffer 116 with each of the decoder and latch pairs (100,104) and (102,106), two rows of pixels on the array 12 may be accessed simultaneously for purposes of resetting one pixel in the row identified with the address, "ADDRST", and for simultaneously accessing the image information contained in one pixel in the row of pixels identified with the address, "ADDROW". Each of these pixels will be in the same column of pixels, the column of pixels selected by the, "ADDCLM" address implemented via the decoder, latch and buffer described above with reference to FIG. 3.

The one of these two selected pixels which is not to supply image information is reset by connecting the negative plate of capacitor 44 to trace 54 carrying reference voltage signal "VSSA", via the FET 70 under control of the NOR gate 64. That is, what ever charge has accumulated on the capacitor 44 is drained to the trace 54. After this reset event, the capacitor 44 once again begins to store charge from photodiode 42 which is produced in response to the light energy incident on this photodiode. This charge storage over time is analogous to time integration of light intensity and results in a charge stored on the capacitor 44 which is indicative of light flux on the photodiode 42. This charge storage on capacitor 44 and time integration of light intensity on the photodiode 42 will continue in the reset pixel until the pixel is again reset, or until the pixel in selected to provide image information, as explained below.

However, it should be understood at this time that the sensitivity of the photodiodes of the pixels 40 in array 12 is such that they would saturate their charge storage capacitors 44 under usual circumstances in a time shorter than that required to complete a scan of the array 12, if this scan is conducted in the conventional row by row order. Consequently, a variable rolling reset of the pixels in implemented by serially resetting pixels a row or more in advance of and in the same columns as pixels which are being accessed for their image information. This rolling reset is variable in that the resetting pixels may be one or more rows in advance of the imaging pixels. Thus, the time required for the pixel imaging scan to reach a particular pixel after it is reset is variable and is an integer multiple of the scan time for each row. Of course, the time between the resetting of a pixel and its access for image information is the integration time during which light intensity as represented by charge production at the photodiodes 42 is stored in the capacitors 44 as an indication of light flux. Further, when a windowing operation is carried out on the array, the resetting of pixels and their scanning can be effected in a variable pattern under control of control circuit 32 in order to effect an integration time on each pixel which is selectively shorter (or conceivably even longer) than the scan time for the entire array 12. That is, because during windowing on the array, the pixels of each window will be scanned at the same rate used in scanning the entire array, but only a part of the array (that within the windows) is scanned, the frame time for the windows will be considerably less than that for the entire array 12 so long as the windows occupy less than the entire area of the array 12.

However, the resetting of pixels on the array 12, or in a particular window on the array, can be effected without simultaneously reading image information from other pixels on the array or in the window. That is, the resetting scan of the array or the resetting scan of a window can precede the imaging scan by a time greater than the frame time for array or the window, if desired. This feature allows the time integration on the array to be variable, and to be utilized as a sensitivity adjustment allowing the sensitivity of the array to be adjusted downwardly when a high-level image source is viewed, and to also be adjusted upwardly in order to image low-level sources which might not be imaged if the reset time for the integration on each pixel were limited by the scan time of the array. That is, a longer time integration can be effected in order to image these low level sources. This feature is particularly important when a low level source is included in a view also including a high level source, which may also be varying (i.e., blinking, flaring, or wavering, for example) in a fixed pattern. On the one hand, the pixels where the high-level source is imaged may simply not be interrogated for their image information. Or on the other hand the pixels where a varying source is imaged may be reset in a pattern corresponding to the pattern of variation of the source, and synchronized with the distracting part of the variation cycle to exclude this part of the source image.

In order to select the one pixel of the two pixels in a column which is to provide image information, the output 114 from latch 106 is also supplied to a corresponding multitude of pixel output buffers. An exemplary one of the pixel output buffers is indicated with the numeral 126 on FIG. 4. As is schematically indicated, these pixel output buffers 126 each function as an FET transistor, and are individually connected to the individual traces 78 carrying the image signal, "CCVL" for a particular row of pixels. In response to the outputs 96 produced in response to a column address, "ADDCLM", and an output 114 produced in response to a row address, "ADDROW", a particular pixel 40 is selected out of the array 12 to provide image information by toggling the signal on the traces 56 and 58. When the signal on trace 56 goes logic high, FET becomes conductive to conduct FET 74 to trace 78 (viewing FIG. 2). The conductivity of FET 74 is determined by the charge stored on the capacitor 44. That is, capacitor 44 in connected to the gate 72 of FET 74 so that this transistor forms an amplifier producing an analogue signal on trace 78, (that is, the signal "CCVL") indicative of the charge level stored on the capacitor 44.

Figure 8:
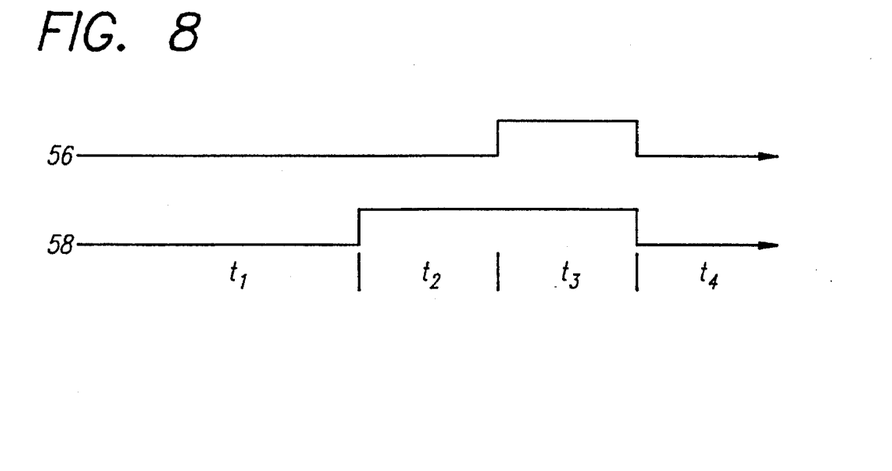
FIG. 8 provides a timing diagram for the pixel seen in FIG. 2.

FIG. 8 provides a timing diagram, which during a time period t1 indicates a logic low signal on both of the traces 56 and 58 so that NOR gate 64 turns on FET 70 and discharges capacitor 44 to reset the pixel 40. During a time period t2, the signal on trace 58 is logic high so that the switch 70 is open and capacitor 44 charges in response to charge production at photodiode 42 dependent upon incident light. As discussed, this storage of charge over a time period is analogous to time integration of the light intensity on the photodiode 42 so that the stored charge level is indicative of light flux on the photodiode. In time period t3, both of the signals on traces 56 and 58 are logic high so that switch 70 remains closed and switch 76 connects the output signal from amplifier transistor 74 to trace 78 as signal "CCVL". This output signal is indicative of the stored charge on capacitor and the light flux incident on the photodiode 42 during the time integration period. During time t4, the signals on traces 56 and 58 are once again both low so that the pixel is reset in preparation for another interval of time integration storing charge on capacitor 44 dependent on the light flux incident on the photodiode 42.

By simultaneously switching on the pixel output buffer 126 connected to the row in which the selected pixel is located (that is, the buffer 126 connected to the trace 78 for that row of pixels), the image information from this particularly selected pixel is conducted via one of the multitude of pixel output buffers 126 to an analogue image output buffer, indicated on FIG. 4 with the numeral 128 and also seen in FIG. 5. This analogue image output buffer 128 has connection with each of the plural pixel output buffers 126, as is indicated by the plural arrows 126'. However, only one pixel output buffer 126 at a time connects a particular pixel to the analogue image output buffer 128. This output buffer 128 provides a load which is driven by the transistor amplifier in each pixel when a particular pixel is connected to the output buffer 128 and forms a voltage follower circuit providing an output indicative of the time-integrated charge level on the capacitor 44 of the selected pixel.

That is, the analogue pixel output buffer 128 includes a pair of FET's 130 and 132 in series between conductors 134 and 136 which carry the analogue voltage levels Vssa and Vdda, respectively. The FET 130 at its gate is controlled by a biasing voltage indicated as Vbias2, while the FET 132 at its gate is connected with the signal CCVL via an interposed capacitor 138. The capacitor 138 and the incoming image signal CCVL are connected to the conductor 136 carrying voltage level Vdda via an interposed FET 140. This FET 140 is controlled at its gate by an analogue biasing voltage designated as Vbias1. In order to increase the speed at which pixels may be interrogated for their image information by taking advantage of the tendency of the transistor amplifiers to respond to a signal input change in one direction faster than they are able to respond to a signal input change in an opposite direction, an analogue reference voltage, "Vcmp" is provided on a conductor 142, and is connected via an interposed FET 144 intermediate of the capacitor 138 and the gate of FET 132. The FET 144 is controlled at its gate by a clocked signal designated as "CLKCMP".

In order to complete the selective voltage follower circuit 128, an FET 146 is provided between the connection of the incoming CCVL signal and the capacitor 138. This FET 146 is controlled at its gate with the clocked precharging signal "CLKPC". As was explained above, an advantage of the present invention is its ability to selectively exclude fixed pattern signals. One aspect of this exclusion of unwanted image signal was explained above with respect to the resetting scan of the pixels in the array 12. However, the analogue image output buffer 126 also can be used to filter unwanted noise out of the analogue image stream. That is the pulsating blinking or flaring parts of a noisy image signal may be additionally excluded by selective operation of the analogue pixel output buffer 128 with respect to those pixels subject to such an image source. By selective operation of the analogue image output buffer to modify its time-responsiveness to the pattern of signal changes originating with the pixels in the array 12 as they are scanned at a particular scanning rate, it is possible to reduce the response of the buffer 128 to signal changes at selected frequencies. Also, because the pixels themselves are not absolutely identical, it is possible to cancel the slight pixel-to-pixel image jitter which would result from these differences in the pixels themselves. The analogue image output buffer 128 provides an analogue signal stream indicated as, "Vout(analogue)" which includes filtered serial information of the time-integrated light intensity (light flux) which has fallen upon the scanned pixels in the time since their last previous reset and up to the time the pixels are accessed for their image information.

Figure 6:
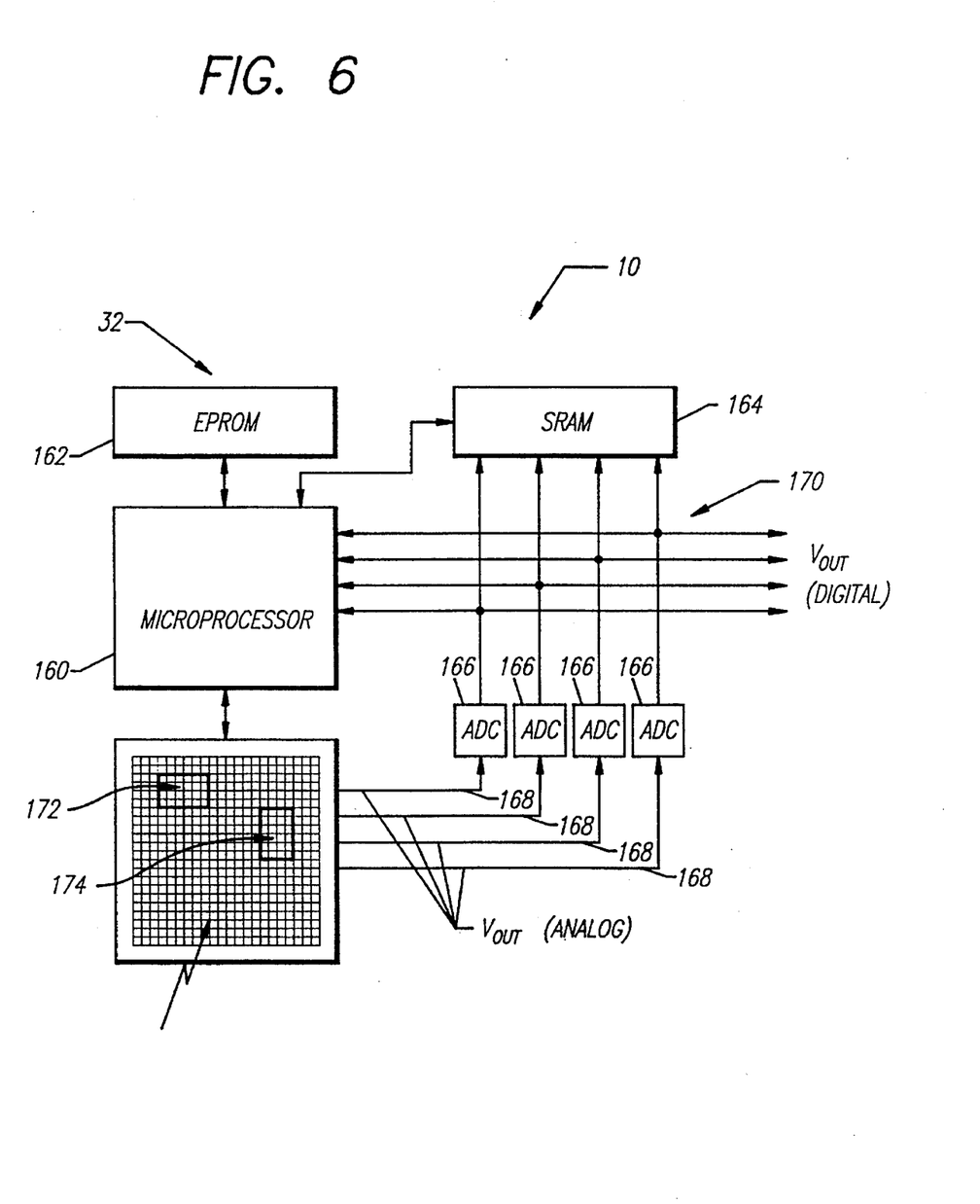
FIG. 6 is block diagram representation of an imaging system including the imaging array and signal acquisition and processing circuitry depicted in the preceding Figures.

FIG. 6 shows that the imaging device 10 also includes as part of or in association with the control circuit 32, a microprocessor 160, long term and short term memory (an EPROM 162 and SRAM 164, respectively), a number of serially-operating analogue-to-digital converters (digitizers) 166, and the array 12. For purposes of simplicity in illustration and description of FIG. 6, the portions of the imaging device 10 depicted and described with reference to FIGS. 3, 4, and 5 are represented on FIG. 6 as part of the array 12. That is, the serial stream of image information [signal, "Vout(analogue)] from the analogue image output buffer 128 is represented on FIG. 6 as being carried on four parallel conductors 168 to each of the four digitizers 166.

While FIG. 6 illustrates the imaging device 10 as including four digitizers 166, a different number of digitizers may be used. As discussed above, the settling time of the digitizers, the desired speed of accessing image information from the pixels of an imaging device, and considerations of cost and complexity determine how many digitizers are used in a digital imaging system. Preferably, the imaging device seen in FIG. 1 will include the microprocessor 160, and the memory devices 162, 164, along with the digitizers 166, as part of the control circuit 32, or these components may be located on the base 16 below the substrate 14 of array 12 and also below the part of the control circuit seen in FIG. 1. The microprocessor 160, memory devices 162 and 164, and digitizers 166, share a four-wire data bus 170 which also provides an output signal "Vout(digital) which is the digitized equivalent of the image signal "Vout(analogue).

FIG. 6 also illustrates an example of windowing on the array 12 in which a pair of windows 172 and 174 are defined on the array. In other words, the pixels of the windows 172 and 174 are scanned more frequently than the pixels of the rest of the array 12. The pixels of the rest of the array 12 outside of the windows 172 and 174 may not be scanned for image information at all, or may be scanned at a rate less than the scanning of the windows 172 and 174. In either case, because of the reduced number of pixels in the windows 172 and 174 in comparison to the number of pixels in the entire array 12, the windows 172 and 174 may be scanned at a frame rate much greater than would be possible if the entire array 12 had to be scanned.

Figure 7:
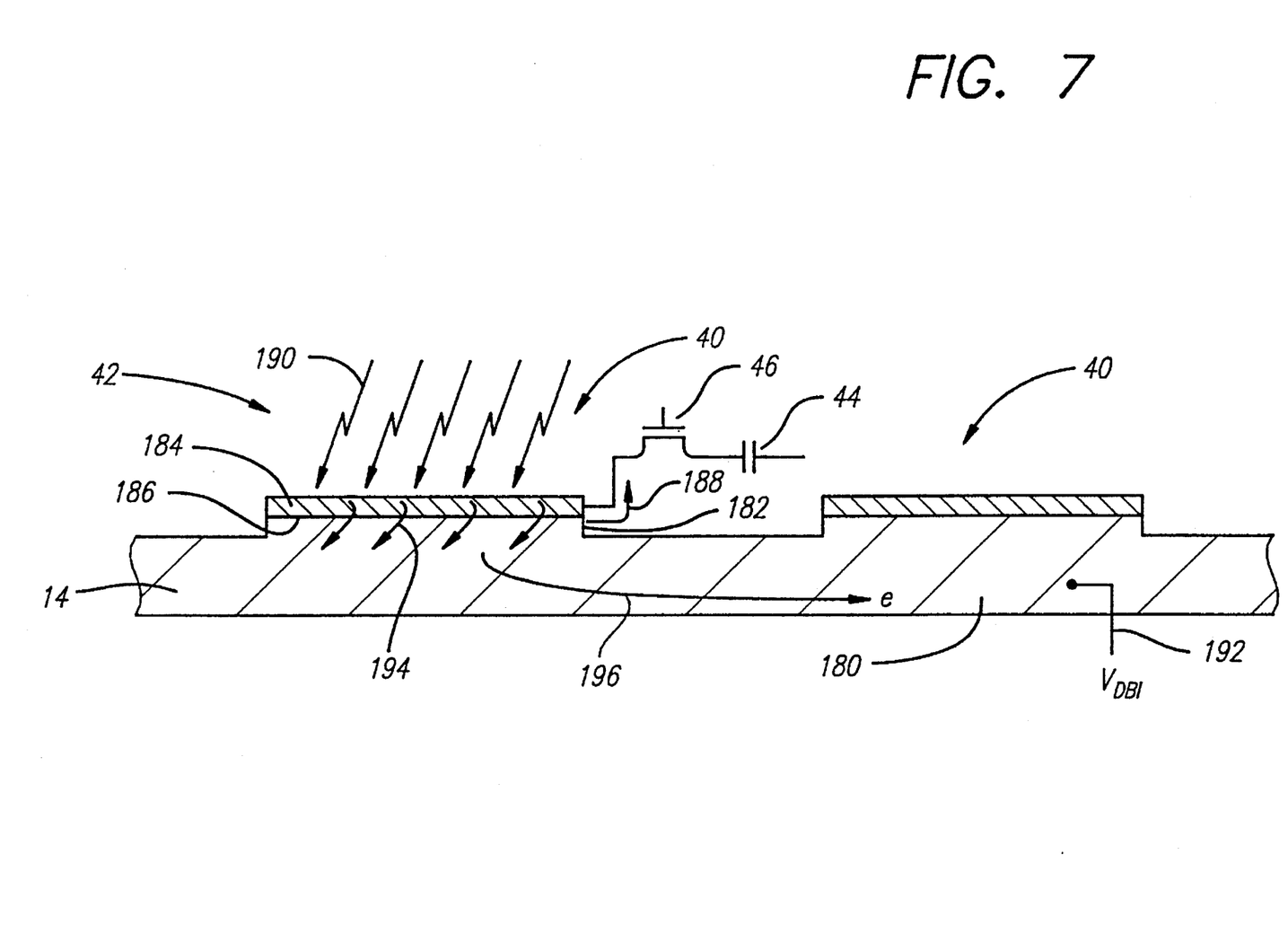
FIG. 7 provides an exemplary schematic cross sectional view of the array portion of the imaging device seen in FIG. 1, taken at a pixel thereof.

FIG. 7 provides a schematic cross sectional view of the substrate 14 at an exemplary pixel 40. This cross sectional view provides a schematic depiction of the P-type InSb substrate material 180 with a boss portion 182 carrying metallic film 184 to define a metallurgical junction 186 cooperatively defining the photodiode 42. The metallic film 184 has connection to FET 46 and Capacitor 44, as is schematically illustrated, to provide an electron flow, depicted by arrow 188, in response to light flux represented with arrows 190. Those ordinarily skilled in the pertinent arts will recognize that the FET 46 and capacitor 44 will be defined within the substrate 14 itself, as will the conductive traces necessary to effect the depicted circuit connections. In order to provide inherent anti-blooming for the pixel 40, the substrate 14 at P-type material 180 has connection with the analogue bias voltage Vdbi, as is represented by the arrow 192. In the event that the light flux 190 is intense, or above the level needed to saturate the capacitor 44 in a given charge storage time period, the excess charge (electron flow) from diode 42 spills into the P-type material 180 of substrate 14. This spilling of excess charge is represented schematically with the arrows 194. In the P-type material 180 of substrate 14, the excess charge from diode 42 is combined with the majority carriers and flows to the charge drain represented by the connection with Vdbi, as is depicted with arrow 196.

The Inventor has built and operated an array having plural pixels as depicted. Under testing with a point-source black body infrared light source operating at 325° K, effecting an 80% of full scale output of the illuminated pixels these illuminated pixels had a measured response uniformity with a standard deviation of less than three percent. This uniformity of pixel response shows that the blooming of the image from the pixels with high levels of illumination to those with lower levels of illumination was not occurring in the array.

Further to the above, by now the reader will understand that a number of windows other than two may be defined on the array 12, and that the variable rolling reset feature and variable time integration feature may be used to image light sources in the windows (172 and 174, for example) which have differing image intensities. That is, the variable rolling reset feature may be used to effect a reset and variable integration time for the pixels in window 172 which allows the pixels of this window which are receiving the greatest light flux to approach but not reach saturation in the allowed integration time. This operation will result in greatest possible contrast within the window 172. On the other hand, the window 174 may be imaging a variable light source which varies periodically with period longer than that required to image the low intensity portion of the variable source (i.e., the source may include a pulsation flare). In imaging of the source with window 174, the pixels of this window may be accessed for resetting such as to exclude the flaring portion of the light source cycle, and to time integrate during the low-intensity portion of the source cycle. Those ordinarily skilled in the pertinent arts will recognize that such operation minimizes the chances of the imaging device being overloaded and swamped with incoming light so that the imaging system is blinded. Each of these functions of the imaging device 10 is under the control of the control circuit 32 including the microprocessor 160.

Figure 9:
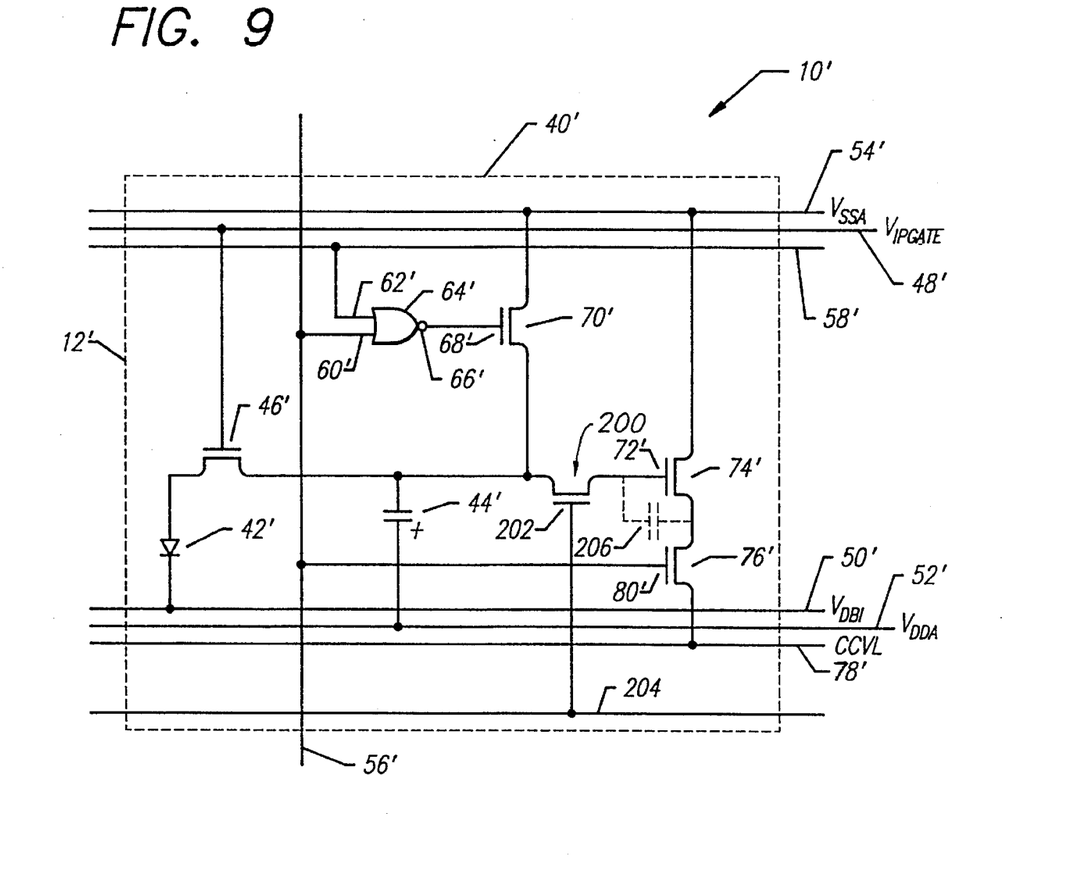
FIG. 9 presents a schematic representation like FIG. 2, but depicting a pixel of an alternative embodiment of the invention.

FIG. 9 depicts an image element or pixel of an alternative embodiment of the present invention. In order to obtain reference numerals for use on FIG. 9, features of this Figure which are analogous in structure or function to features described above are referenced with the same numeral used previously, and having a prime added thereto. FIG. 9 depicts a pixel 40', which is much like the pixel of FIG. 2, as is indicated by the multitude of features having primed reference numerals. The remainder of the imaging device 10' which includes the pixel 40' is the same as that depicted and described above with the exception of one additional electrical connection between the control circuit 32 and the array 12. This singular additional electrical connection will be described in connection with the description of the pixel 40' itself, and will be easily understood with regard to the remaining pixels of the entire array 12' because each pixel of the array shares in this common electrical connection.

Viewing now FIG. 9, the pixel 40' is seen to include an additional FET transistor 200 disposed between the connection of capacitor 44' with the gate 72' of transistor 74', and also between the connection of capacitor 44 to trace 54' via transistor 70'. The gate 202 of transistor 200 is connected to, and the transistor is controlled by the voltage level signal on, a trace 204 extending across the array 12'. Each of the pixels in the array 12' have a transistor 200 with its gate 202 electrically connected to the trace 204. Thus, while the trace 204 is shown as extending across the array 12' so that each pixel 40' in the row can have connection with this trace, and the other rows of pixels in the array 12' will have connection to respective traces for each row, all of which are connected with one another, such an arrangement is exemplary only. The geometric arrangement of the electrical connection to the transistors 200 on the array 12' is not critical.

Importantly, the transistor 74' at its gate 72' displays an inherent capacitance, which is depicted on FIG. 9 as a virtual capacitor 206. The pixel 40' in all respects can be operated just like the pixel 40 described above. During operation of the pixels 40' as described above, a logic high signal will be maintained on trace 204 so that the transistor 200 is conductive and appears like the "hard wired" connection of capacitor 44 to transistor 74 of FIG. 2.

However, the presence of the additional transistor 200 in the pixels 40', which are all controlled in common with one another, and the virtual capacitance of transistor 74', makes possible an entirely new function with the imaging device 10' including these features. This additional function might be considered a "snap shot" capability, because it allows the pixels of the array to all be simultaneously reset, and to all subsequently go through an integration time period during which light flux on the photodiode 42' is indicated by a stored charge on the capacitors 44'. Recalling the timing diagram of FIG. 8, providing a logic low signal on all of the traces 56' and 58' simultaneously resets all of the pixels 40' in the array 12 in preparation for a concurrent time integration interval which is started by changing the signal on trace 58' to be logic high. During this time integration period, the signal on trace 204 is logic low so that the pixels are not reset or read for their video information. This time integration period is analogous to shutter speed of a conventional camera, an indication of the time during which the image recording medium or photographic film is exposed to incident light from the image scene.

At the completion of the integration time, the stored charges on the capacitors 44' of the pixels of the entire array can in part be simultaneously communicated to the gates 72' of the transistors 74' by momentarily providing a logic high voltage signal on the trace 204. This logic high signal causes the transistors 200 substantially simultaneously to become conductive, and to transfer charge to the virtual capacitor 206 so that the voltage level at this capacitor is indicative of the light flux on the respective pixels during the integration time period.

With the "snap shot" thus taken, the signal on trace 204 is returned to the logic low level and the pixels are interrogated for their video information as described above. Because the pixels can be accessed randomly, this interrogation of the pixels may be performed in any order and using all or any part of the array 12', as will be clear by now. However, this interrogation of the pixels provides an output signal not indicative of the charge stored on the capacitor 44' at the time of interrogation, but indicative of the charge on the capacitor at the moment the snap snot was taken, as indicated by charge stored on the virtual capacitor 206 (the inherent capacitance of FET 200). Thus, even though the pixels of the array 12' after a "snap shot" are sequentially accessed for their video information, the "snap shot" feature provides a video image as though the pixels were all accessed simultaneously, or in a massively parallel fashion including the entire array 12, or that portion of the array which is of interest.

FIG. 1 also illustrates an embodiment of the present invention which is particularly useful for large arrays (i.e., arrays of, for example 512×512 pixels). In the case where the array 12 includes a large number of pixels a data transmission bottle neck becomes apparent. That is, the large number of pixel addresses which must be fed into the decode and latch circuits 22, 24, and the large amount of video information to be fed out of the array 12, simply exceeds the capabilities of the connector pads 38.

Accordingly, to overcome this data transmission bottle neck, a control cache 208 is included in the image device 10, on substrate 14. This control cache 208 is interconnected with each of the decode and latch circuits 22, 24 by respective data busses 210, 212. Thus, it will be understood that the control cache 208 is also interconnected with the microprocessor control circuit 32 via the interconnect structures 34 and 36.

Control cache 208 performs a buffer memory function so that pixel addresses, commands for window defining, commands for time integrations, commands for pixel resetting and gain variation on the pixels, as well as for taking a "snap shot" at a particular window on the array 12, or with the entire array, etc., can be fed into the imaging device 10 using a smaller number of the connector pads 38, but at a higher clock rate. Subsequently, the control cache 208 feeds out the pixel addresses, etc., to the decode and latch circuits 22, 24, on a first-in, first-out basis and at the clock rate of the imaging device 10. As a result, a significant number of the connector pads 38 are freed for feeding out video information and for other uses in connection with the operation of imaging device 10.

A particular advantage of the control cache 208 becomes apparent when it is realized that on imaging mosaic may include plural imaging devices 10 in an array. Such an imaging mosaic of arrayed imaging devices 10, may have particular utility in medical applications, or in particle detectors. However, such an array of imaging devices 10 also presents a considerable challenge with respect to providing connections to the imaging devices and routing of electrical conductors of the array. The use of the control cache 208 allows a lesser number of conductors to serve the imaging devices, and eases this connection and conductor routing burden.

In view of the above, it is apparent that the present invention provides an imaging device which includes multiple image elements or pixels in an array. The device allows the pixels of the array to be accessed individually or in groups, and also allows a variable time-integration of light flux to be effected at the pixels themselves. Accordingly, the imaging device allows one or more windows to be defined on the array of pixels within which the pixels are accessed to obtain image information. Also, the imaging device allows the pixels to be accessed to exclude unwanted or undesirable image information by effecting a reset of the pixels preparatory to a flux integration time and subsequent interrogation of the pixels for the desired image information. An additional advantageous aspect of the present image device is the selective time-domain filtering or cancellation of noise or unwanted image signal with a fixed pattern.

Additionally, the present image device includes structure which safeguards the imaging array in the event the array is flooded with light and allows excess charge generated in photodiodes of the array to leak off into an underlying substrate. Also, the image generated on the array is prevented from blooming or flooding across the array in the event of an excessively high signal by the combination in the array at the pixels themselves of an image charge leakage path of selected resistances. The present invention also provides a "snap shot" capability which provides a video image of the scene viewed by the imaging device in a massively parallel format. Finally, the present inventive imaging device also provides a control cache memory so that control commands can be fed to the device at a high rate using a smaller number of electrical connections to the device. This control cache facilitates arrays having a large number of pixels (i.e., 512×512 pixels, or more), as well as the formation of a mosaic of several imaging devices in an array.

While the present invention has been depicted, described, and is defined with reference to a particularly preferred exemplary embodiment of the invention, such reference does not imply a limitation on the invention, and no such limitation is to be inferred. The invention is capable of considerable modification and variation, as will suggest themselves to those ordinarily skilled it the pertinent arts. For example, the exemplary embodiment of the invention herein depicted and described allows random access of each individual pixel on the image array. However, for some uses it may be desirable to access the pixels in groups. In this case each group of pixels, rather than each pixel, would have an associated access trace 56 and 58, with the resetting gate 64, and output toggling transistor 76 of the grouped pixels all connected together in connection with the respective access traces. The pixels in a group would each have connection with a trace analogous to the trace 78 carrying the signal "CCVL". However, the groups may include a selected number of pixels, which may be arranged in a row (e.g., a group of six pixels in a row), or in a column (e.g., six pixels in a column), or in a rectangular or square array (e.g., groups of 2 by 2 pixels for four pixels in each group) on the array 12. Thus, it is easily seen that the geometric layout of the pixels on the array may require an image output trace for each row of pixels, or only a single trace for each several rows of pixels where the groups of pixels span several rows of the array. In view of the above, the invention is intended to be limited only by the spirit and scope of the appended claims, giving full cognizance to equivalents in all respects.

I claim:

1. An imaging device comprising:

a semiconductor substrate;

plural light-responsive image elements defined in an array on said substrate;

and means for randomly accessing said image elements individually or in groups of less than the full plurality of elements on said array;

wherein said random image element accessing means includes a plurality of first and a plurality of second conductors traversing said array, each individual image element or group of image elements being associated with a respective one of said plurality of first conductors and a respective one of said plurality of second conductors;

wherein said image elements each include means for photovoltaically producing an electrical charge in response to incident light, and storage means for storing said charge at said image element;

wherein said image elements each also include means for draining stored charge from said charge storage means in response to an element resetting signal; and wherein said charge draining means includes a logic gate, and a conductor carrying an analogue voltage level.

2. The imaging device of claim 1 wherein said imaging element resetting signal is carried upon said respective one of said plurality of first or plurality of second conductors, and said resetting signal affects said logic gate to switch said stored charge to said conductor carrying said analogue voltage level.

3. The imaging device of claim 1 wherein each image element further includes an amplifier providing an output signal indicative of charge stored in said charge storage means.

4. The imaging device of claim 3 wherein each image element further includes a switch connecting said amplifier to a conductor carrying said output signal externally of said array.

5. An imaging device comprising:

a semiconductor substrate;

plural light-responsive image elements defined in an array on said substrate;

and means for randomly accessing said image elements individually or in groups of less than the full plurality of elements on said array;

wherein said random image element accessing means includes a plurality of first and a plurality of second conductors traversing said array, each individual image element or group of image elements being associated with a respective one of said plurality of first conductors and a respective one of said plurality of second conductors;

wherein said image elements each include means for photovoltaically producing an electrical charge in response to incident light, and storage means for storing said charge at said image element; and wherein said photovoltaic means includes a junction photodiode, said photodiode including a semiconductor substrate and a metallic film forming a metallic interface with said substrate, said metallic film having electrical connection with said charge storage means, and said substrate having electrical connection with a source of analogue voltage allowing excess charge to spill from said photodiode into said substrate and to said source of analogue voltage, whereby intense light incident upon said photodiode causes excess charge to spill into said substrate without significant effect of said excess charge upon said charge storage means of adjacent image elements in said array.

6. The imaging device of claim 5 further including second means for storing said charge at said image element, and switch means for selectively closing and opening connection between said first-recited charge storage means and said second charge storage means.

7. The imaging device of claim 6 further including means for simultaneously closing and opening said switch means of each of said plural image elements of said array, to thereby store on said second means for storing said charge of each of said plural image elements of said array a respective charge indicative of a "snap shot" of image.

8. The imaging device of claim 6 further including a control cache memory for receiving control commands for said image elements at a high rate, for holding said control commands, and for providing said control commands to said image elements at a slower rate on a first-in, first-out basis.

9. The imaging device of claim 5 further including a pair of decoders and a pair of associated latches, each decoder and associated latch of said pair of associated decoders and latches respectively being associated with one of said plurality of first conductors and with one of said plurality of second conductors, whereby said individual image elements or groups of image elements may be accessed by supplying a particular address to each of said pair of decoders.

10. The imaging device of claim 9 further including a processor sequentially generating addresses of image elements or groups of image elements on said array to thereby define an imaging area or window on said array.

11. The imaging device of claim 10 further including a conductor traversing said array and receiving a signal indicative of stored charge on a particular charge storage device in response to access of a particular image element or group of image elements via said decoders, said device further including an image output buffer associated with said particular image element, said image output buffer receiving an enabling signal from one of said pairs of associated decoders and latches to conduct said stored-charge indicative signal externally of said array.

12. The imaging device of claim 11 further including means for providing a coupling load for said signal indicative of stored charge on said particular image element, said means providing said coupling load providing an analogue image output signal.

13. The imaging device of claim 12 wherein said means providing said coupling load further includes means for dynamic alteration of the coupling or gain between said signal indicative of stored charge and said analogue image output signal.

14. The imaging device of claim 12 further including digitizing means for receiving said image output signal and providing a digital signal indicative of said image output signal.

15. A method of providing an image of a scene, said method comprising the steps of:

providing an image element including a photovoltaic element which provides electric charge in response to light flux incident thereon, storing electric charge from said photovoltaic element at said image element, and connecting said stored charge to an output device only in response to an interrogation signal to said image element;

further including the steps of providing an output amplifier at said image element as part of said output device; and wherein said step of providing said output amplifier includes providing a transistor at said image element, and using said stored charge to control an output voltage signal by controlling conductance of said transistor.

16. The method of claim 15 further including the steps of providing a switch in series with said first-recited transistor, and turning said switch on to conduct said output voltage signal externally of said image element.

17. The method of claim 16 further including the step of using another transistor as said switch.

18. The method of claim 16 further including the steps of using a logic gate at said image element to receive said interrogation signal and control said switch.

19. The method of claim 16 further including the steps of providing a switch connecting said stored charge to a reference voltage level, and closing said switch momentarily to reset said image element.

20. The method of claim 19 including the further steps of allowing a predetermined integration time to pass after resetting of said image element, and subsequently to said integration time interrogating said image element by providing said interrogation signal thereto in order to obtain time-integrated image information from said image element via said output device.

21. The method of claim 15 including the further steps of providing an array of plural image elements each substantially identical with said first-recited image element, and providing said interrogation signal only to selected ones of said image elements in said array.

22. The method of claim 15 including the further steps of providing an array of plural image elements each substantially identical with said first-recited image element, and simultaneously storing charge at each of said plural image elements to provide a snap shot of said scene.

23. The method of claim 22 further including the steps of providing a switch at each of said plural image elements which resets said image element by draining stored charge therefrom when closed, and simultaneously closing each of said charge-drainage switches at each of said image elements of said array to prepare said image array for said snap shot charge storage.

24. The method of claim 15 further including the step of using a processor to provide said interrogation signal to said image element.

25. The method of claim 24 further including the steps of using said processor to alter an output amplification level of said output device in preparation for connection of said stored charge thereto.

26. The method of claim 24 further including the step of providing a control cache in association with said processor, using said control cache to receive at a first rate control commands for said processor, using said control cache to hold said control commands, and feeding said control commands from said cache to said processor at a second slower rate on a first-in, first out basis.

27. The method of claim 15 further including defining said photovoltaic element on a semiconductor substrate, providing a conductor traversing said substrate proximate to said photovoltaic element, carrying a reference voltage level on said conductor, and using said conductor to collect excess charge spilling from said image element in response to an excessive level of light flux incident thereon, thereby to prevent said photovoltaic element from spilling excess charge across said substrate.

* * * * *

(12) EX PARTE REEXAMINATION CERTIFICATE (8671st)

United States Patent
Roberts (10) Number: US 5,541,654 C1
(45) Certificate Issued: Nov. 22, 2011

(54) FOCAL PLANE ARRAY IMAGING DEVICE WITH RANDOM ACCESS ARCHITECTURE

(75) Inventor: Peter C. T. Roberts, Gilbert, AZ (US)

(73) Assignee: L-3 Communications Corporation, New York, NY (US)

Reexamination Request:
No. 90/011,410, Dec. 30, 2010

Reexamination Certificate for:
Patent No.: 5,541,654
Issued: Jul. 30, 1996
Appl. No.: 08/486,005
Filed: Jun. 8, 1995

Related U.S. Application Data (62) Division of application No. 08/079,094, filed on Jun. 17, 1993, now Pat. No. 5,452,004.

(51) Int. Cl.
*H03N 03/15* (2006.01)

(52) U.S. Cl. .................. 348/301; 348/302; 348/E3.018
(58) Field of Classification Search ............. 348/301
See application file for complete search history.

(56) References Cited

To view the complete listing of prior art documents cited during the proceeding for Reexamination Control Number 90/011,410, please refer to the USPTO's public Patent Application Information Retrieval (PAIR) system under the Display References tab.

*Primary Examiner* — Deandra Hughes (57) ABSTRACT

An imaging device includes an array of plural imaging elements each of which is responsive to incident light flux to provide an output signal. Each of the imaging elements includes provision for conducting a variable time integration of incident light flux, and alternatively, also for selecting a time interval during which each of the imaging elements simultaneously conducts such a time integration of incident light flux (i.e., takes a snap shot of an image scene). The imaging device includes provision for random access of each image element or group of image elements in the array so that output signals indicative of all or of only selected parts of an imaged scene can be processed for their image information, if desired. The other parts of an imaged scene may not be considered or may be considred for their image informaton at a lower sampling rate than the selected parts of the scene so that image information about the selected parts of the image scene can be accessed at a much higher rate than is conventionally possible. A variable gain feature allows selective canceling of fixed-pattern noise, interference, or unwanted image information. An anti-blooming feature prevents charge from an excessively bright image source from cascading across the array. Also, a control cache memory allows control commands to be fed to the device at a high rate and to be implemented at a slower rate on a first-in, first-out basis.

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4, 15-21 and 24-27 is confirmed.

New claims 28-81 are added and determined to be patentable.

Claims 5-14, 22 and 23 were not reexamined.

28. The imaging device of claim 1, wherein the image elements are accessed in groups.

29. The imaging device of claim 28, further comprising an access trace in connection with one of the logic gates and a group of image elements.

30. The imaging device of claim 1, wherein the logic gate of each charge draining means is provided at the image element.

31. The imaging device of claim 1, wherein the plural light-responsive image elements have a square shape.

32. The imaging device of claim 1, wherein the plural light-responsive image elements have a one of a hexagonal or triangular shape.

33. The imaging device of claim 1, wherein the plural light-responsive image elements are defined in a rectangular array.

34. The imaging device of claim 1, further comprising a processor for controlling the plural light-responsive image elements.

35. The imaging device of claim 34, further comprising a short term memory for use by the processor.

36. The imaging device of claim 34, further comprising an analog-to-digital converter for digitizing signals from said array.

37. The imaging device of claim 34, comprising a plurality of parallel analog-to-digital converters for digitizing signals from said array.

38. The imaging device of claim 34, wherein the plural light-responsive image elements have a processor-controlled variable integration time.

39. The imaging device of claim 34, wherein the processor is adapted to control said plural light-responsive image elements to image light sources which have differing image intensities.

40. The imaging device of claim 34, wherein the processor is adapted to control said plural light-responsive image elements to increase contrast.

41. The method of claim 24, further including the step of providing a short term memory for use by said processor.

42. The method of claim 15 wherein the method further includes the step of varying a time integration of light flux on the image element.

43. The method of claim 24 wherein the method further includes the step of varying a time integration of light flux on the image element.

44. The method of claim 15 wherein the method further including the step of providing an analog-to-digital converter for digitizing the output voltage signal.

45. The method of claim 24 wherein the method further including the step of providing an analog-to-digital converter for digitizing the output voltage signal.

46. The method of claim 44, further including the step of providing an output digital signal indicative of said output voltage signal.

47. The method of claim 45, further including the step of providing an output digital signal indicative of said output voltage signal.

48. The method of claim 15 wherein the step of providing an image element includes providing an array of substantially identical image elements wherein each image element in the array has a square shape.

49. The method of claim 15 wherein the step of providing an image element includes providing an array of substantially identical image elements wherein each image element in the array has one of a triangular or hexagonal shape.

50. The method of claim 15 further including the step of providing an array of substantially identical image elements, and wherein the method further includes the step of providing image information from multiple image elements from the array of substantially identical image elements.

51. The method of claim 47 further including the step of providing an array of substantially identical image elements, and wherein the method further includes the step of providing an output digital signal from multiple image elements from the array of substantially identical image elements.

52. The method of claim 50, wherein the step of providing image information further includes the step of varying the time-integration of light flux for one or more of the image elements in the array.

53. The method of claim 51, wherein the step of providing image information further includes the step of varying the time-integration of light flux for one or more of the image elements in the array.

54. The method of claim 50, wherein the image information is indicative of light sources which have differing image intensities.

55. The method of claim 51, wherein the image information is indicative of light sources which have differing image intensities.

56. The method of claim 50, wherein the step of providing image information further includes the step of varying the sensitivity of one or more of the image elements in the array to approach but not reach saturation of the image elements receiving the greatest light flux.

57. The method of claim 51, wherein the step of providing image information further includes the step of varying the sensitivity of one or more of the image elements in the array to approach but not reach saturation of the image elements receiving the greatest light flux.

58. The method of claim 48, wherein the provided array of substantially identical image elements includes at least 512× 512 image elements.

59. The method of claim 49, wherein the provided array of substantially identical image elements includes at least 512× 512 image elements.

60. The method of claim 50, wherein the provided array of substantially identical image elements includes at least 512× 512 image elements.

61. The method of claim 51, wherein the provided array of substantially identical image elements includes at least 512× 512 image elements.

62. The method of claim 15, wherein providing an image of a scene includes the step of providing a signal indicative of a selected part of an imaged scene at a first sample rate.

63. The method of claim 50, wherein providing an image of a scene includes the step of provding a signal indicative of a selected part of an imaged scene at a first sample rate.

64. The method of claim 24, wherein providing an image of a scene includes the step of processing a signal indicative of a selected part of an imaged scene at a first sample rate.

65. The method of claim 51, wherein providing an image of a scene includes the step of processing a signal indicative of a selected part of an imaged scene at a first sample rate.

66. The method of claim 62, further including the step of providing a second signal indicative of a non-selected part of the imaged scene at a second sampling rate, wherein the second sampling rate is lower than the first sample rate.

67. The method of claim 63, further including the step of providing a second signal indicative of a non-selected part of the imaged scene at a second sampling rate, wherein the second sampling rate is lower than the first sample rate.

68. The method of claim 64, further including the step of processing a second signal indicative of a non-selected part of the imaged scene at a second sampling rate, wherein the second sampling rate is lower than the first sample rate.

69. The method of claim 65, further including the step of processing a second signal indicative of a non-selected part of the imaged scene at a second sampling rate, wherein the second sampling rate is lower than the first sample rate.

70. The method of claim 50, wherein providing an image of a scene excludes image information from one or more non-selected image elements.

71. The method of claim 51, wherein providing an image of a scene does not include an output digital signal a signal indicative of a non-selected part of an imaged scene.

72. The method of claim 62, wherein the first sample rate is higher than a second sampling rate associated with providing signals indicative of all parts of the imaged scene.

73. The method of claim 63, wherein the first sample rate is higher than a second sampling rate associated with providing signals indicative of all parts of the imaged scene.

74. The method of claim 64, wherein the first sample rate is higher than a second sampling rate associated with providing signals indicative of all parts of the imaged scene.

75. The method of claim 65, wherein the first sample rate is higher than a second sampling rate associated with providing signals indicative of all parts of the imaged scene.

76. The method of claim 15, wherein providing an image of a scene includes the step of providing signals from plural imaging devices.

77. The method of claim 24, wherein providing an image of a scene includes the step of providing signals from plural imaging devices.

78. The method of claim 50, wherein providing an image of a scene includes the step of providing signals from plural imaging devices.

79. The method of claim 51, wherein providing an image of a scene includes the step of providing signals from plural imaging devices.

80. The method of claim 50, further including the step of providing a sensitivity adjustment allowing the sensitivity of the array to be adjusted downwardly for imaging a high-level source and to be adjusted upwardly for imaging a low-level source.

81. The method of claim 51, further including the step of providing a sensitivity adjustment allowing the sensitivity of the array to be adjusted downwardly for imaging a high-level source and to be adjusted upwardly for imaging a low-level source.

* * * * *